United States Patent [19]

Carpenter

[11] 4,323,773

[45] Apr. 6, 1982

[54] BAR CODE CONTROLLED MICROWAVE OVEN

[75] Inventor: Lowell L. Carpenter, New Hope, Minn.

[73] Assignee: Litton Systems, Inc., Beverly Hills, Calif.

[21] Appl. No.: 112,997

[22] Filed: Jan. 17, 1980

[51] Int. Cl.³ .......................... G06K 7/10; H05B 6/64; G06F 15/20
[52] U.S. Cl. .................................. 235/473; 235/375; 235/462; 219/10.55 R
[58] Field of Search .............. 126/19 R, 19 M, 275 R, 126/275 E; 219/10.55 R; 235/472, 473, 462

[56] References Cited

U.S. PATENT DOCUMENTS

| | | | |
|---|---|---|---|
| 3,869,599 | 3/1975 | Sansone | 235/473 |
| 3,920,959 | 11/1975 | Wefers | 235/472 |
| 4,162,381 | 7/1979 | Buck | 219/10.55 B |
| 4,236,055 | 11/1980 | Kaminaka | 219/10.55 B |

FOREIGN PATENT DOCUMENTS 2026726  2/1980  United Kingdom ......... 219/10.55 B

Primary Examiner—Robert M. Kilgore
Attorney, Agent, or Firm—Robert E. Lowe; Nate F. Scarpelli

[57] ABSTRACT

A microwave oven including a microwave power source, a microprocessor controller for controlling the microwave power source in response to user entered input data relating to cooking modes, cooking time, etc., optically readable bar codes associated with respective input data, a hand held optical scanning wand extendable from the oven to be moved adjacent a bar code for reading same, and means for converting the optically read bar code to provide corresponding control signals and coupling the control signals to the microprocessor. The microwave power source is controlled in accordance with the optically read bar code relating to the respective input data. The optical scanner can read a bar code on a food package or a bar code related to a recipe to automatically enter into the controller the corresponding microwave oven cooking instructions.

11 Claims, 6 Drawing Figures

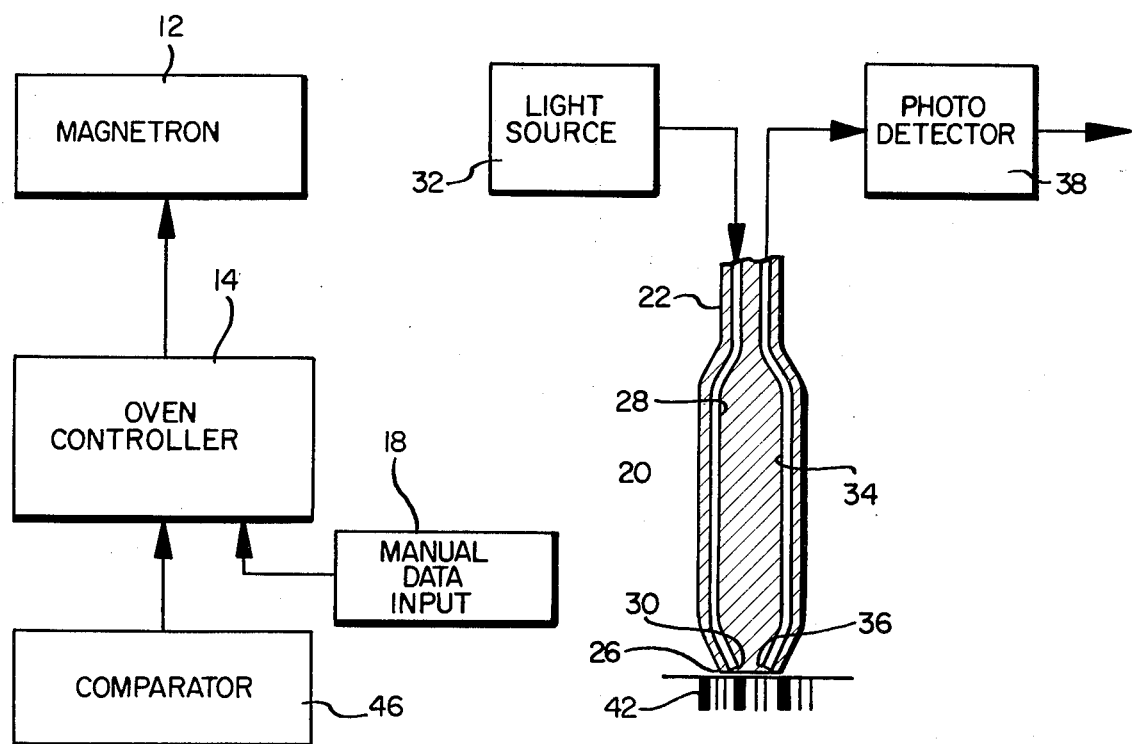

BAR CODE CONTROLLED MICROWAVE OVEN

This invention relates to microwave ovens and in particular to improved apparatus for entering the input data controlling the microwave power source during oven use.

BACKGROUND OF THE INVENTION

Microwave ovens presently in use employ various input devices such as electrical and mechanical keyboards, card readers, etc. for entering the input data into the microwave controller. In such units the oven user manually actuates the keyboard to enter data relating to the type or mode of oven operation desired, i.e., bake, roast, reheat, etc., as well as the length of the desired cooking time. Recently, with the incorporation of microprocessor controllers for the magnetron power source, magnetic card readers can be used to enter information from a manually selected magnetic card containing cooking instructions.

The present microprocessor controllers are capable of receiving a substantial amount of information. In order to utilize present day microwave ovens incorporating such controllers, and in order to achieve the best cooking results, a substantial amount of information must be entered. This requires the oven user to manually enter a long series of input data on the keyboard, increasing the chances of error in the cooking instructions. While a magnetic card could be selected which contains all of the required input data, the information format does not allow flexibility in changing the cooking instructions. This is often desired by the oven user. Thus, it is desired to fully utilize the capability of microprocessor controllers by enabling the oven user to very rapidly and accurately enter the cooking information while simultaneously simplifying the operations required by the user as well as providing flexibility in changing the instructions.

SUMMARY OF THE INVENTION

In accordance with the principles of the present invention, there is provided a microwave oven wherein an optical code comprising a series of bars and spaces is respectively associated with each data input. A hand-held optical scanner wand is moved by the oven user adjacent the optical codes for reading the bars and spaces and providing a control signal representing the associated input data. The control signal is then entered into the microwave controller so as to control the magnetron power source in response to the optically read code.

In one illustrated embodiment an optical code is associated with each of the respective cooking instructions such as bake, roast, etc. as well as with the desired Cooking Time, Start Cooking Cycle, Change Cooking Cycle, Erase Input, etc. The optical scanner is pulled by the oven user from a retractable mechanism on the oven front panel and moved adjacent the desired optical code for reading the associated bars and spaces. The optical scanner includes fiber optic transmission lines for coupling a light source to the respective optical code and coupling the reflected light from the optical code to a photodetector.

The optical code may also be printed on food packages or on respective recipes for rapidly entering this information into the controller.

BRIEF DESCRIPTION OF THE DRAWINGS

FIG. 2 is a block diagram illustrating several components of the invention for incorporating the optical scanning apparatus;

FIG. 3 is a schematic drawing illustrating a hand-held optical scanner wand incorporating fiber optic transmission lines coupling the light source to the optical code and a photodetector receiving the reflected light;

FIG. 4 is a fragmented elevational view of the front panel of the microwave oven shown in FIG. 1, illustrating several examples of the input data each having an associated optical code in the form of bars and spaces;

DETAILED DESCRIPTION

Figure 1:
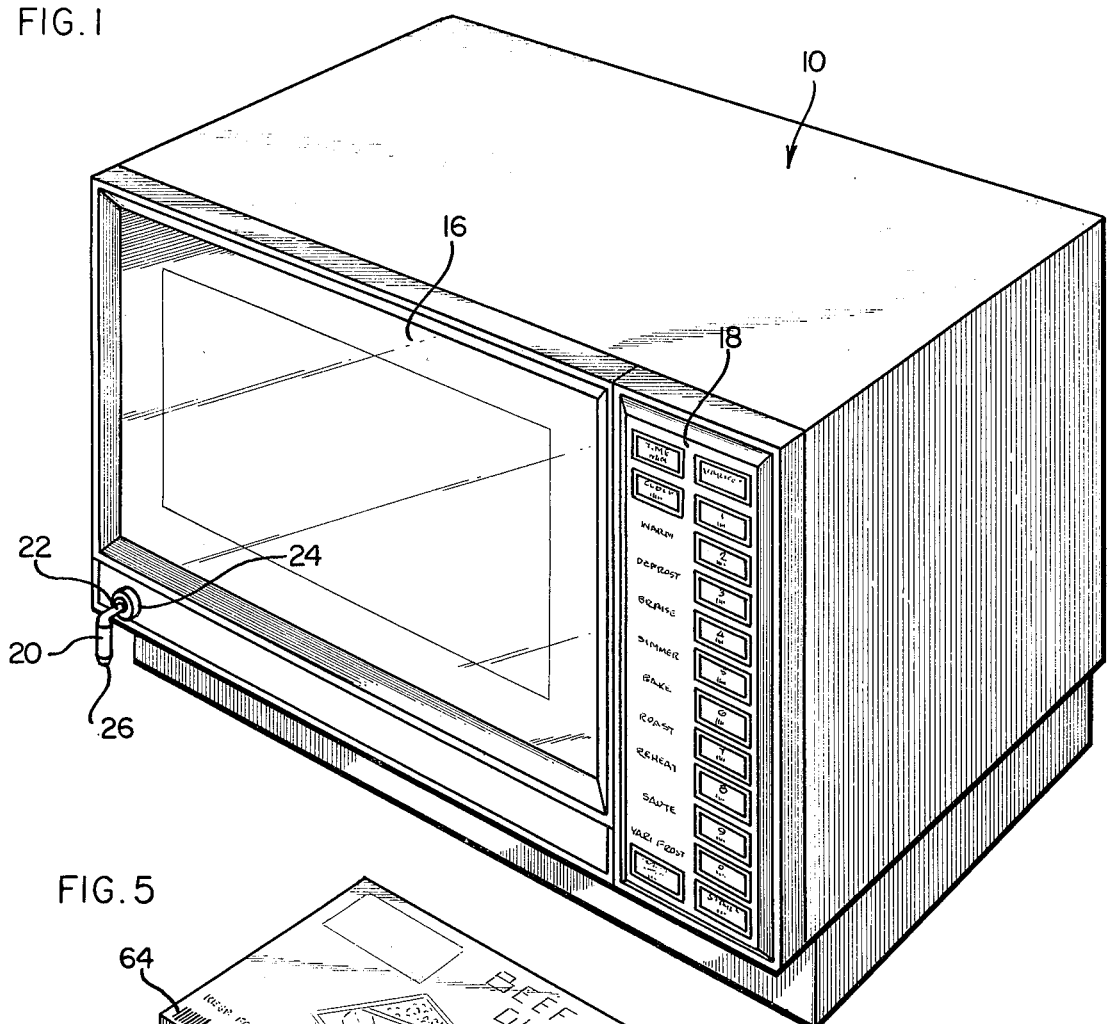
FIG. 1 is a perspective view illustrating a microwave oven constructed in accordance with the principles of the present invention and includes a front panel having optical codes associated with various input data as well as a retractable optical scanner.

With reference to FIGS. 1 and 2, there is shown a microwave oven 10 including a magnetron power source 12 supplying microwave energy for heating and cooking food items under control of a microprocessor controller 14. Food items to be cooked are placed within a microwave oven cavity behind oven door panel 16.

Oven door panel 16 also includes a plurality of respective data input positions generally illustrated in FIG. 1 at panel position 18. The input data corresponds to the mode or type of oven operation desired by the oven user, such as Warm, Defrost, Braise, etc. Other data positions are provided for setting in the desired cooking time, changing or erasing the input data, and starting the cooking cycle. In a manner well-known in the art, respective keyboard data entry switches are provided at data entry location 18 so that the oven user can manually insert the data if desired. The microwave oven 10 also includes well-known means for coupling the manual data input 18 to the microprocessor oven controller 14 to operate the magnetron in accordance with the input data.

Microwave oven 10 also includes an optical scanner wand 20 at the end of a flexible cable 22 mounted for retractable movement by the oven user within mounting means 24. A reading head portion 26 at the front of optical scanner 20 is provided with a small aperture for coupling light therethrough. Reference may be made to FIG. 3, wherein there is illustrated a first fiber optic line 28 suitably mounted within the hand-held optical scanner wand 20 and having one end 30 adjacent the front aperture of reading head 26 and the other end of the fiber optic line extending within flexible cable 22 and connected to a light source 32. A second fiber optic line 34 is mounted within optical scanner 20 with one end 36 immediately adjacent the front aperture of reading head 26 and the other end of the fiber optic line 34 being coupled to a photodetector 38. The front reading head 26 of optical scanner 20 may be placed adjacent a surface 40 containing an optical code 42 in the form of bars and spaces representing characters as illustrated in FIG. 3. Optical code 42 is an illustrated example of the types of codes readily available and are commonly known as "Bar Codes". Various examples of such bar codes are shown for instance in the following U.S. Pat. Nos. 3,838,251; 4,012,716; 4,007,377; 4,035,615; 3,716,699; 3,784,795; 3,798,450; 3,526,773; 4,074,114; 3,891,829; 4,074,852; 4,079,239; 4,114,030; 4,135,663; 4,096,992; 3,928,759; 3,631,250; and 3,993,894.

As illustrated in FIG. 3, light source 32 transmits light through fiber optic line 28 through reading head 26 to optical code 42. The reflected light from optical code 42 is coupled through fiber optic end 36 and line 34 to the photodetector 38 for conversion into electronic signals which are then processed by amplifier 44 and a comparator 46 for entry into the microprocessor controller 14. The manner in which the optically coded characters shown in the optical code example 42 are converted to a corresponding electronic signal representing such characters is well-known, reference, for instance, may be made to the aforementioned United States Patents illustrating bar coded systems and techniques.

In the expanded view of FIG. 4, data entry position 18 can be seen as including a corresponding optical code 48, 50, 52, etc., at each of the data entry positions, shown for instance as bake, roast, reheat, etc. It is to be understood that each of the optical codes 48, 50, etc. are of the type illustrated as optical code 42 in FIG. 3. Thus, placing the optical scanner 20 with reading head 26 adjacent for instance optical code 48 and moving the scanner across the code 48 in the required direction enables data relating to the selected Bake Mode to be entered into microprocessor controller 14 without the operator manually actuating the Bake Mode switch position shown in FIG. 4.

It is to be understood, of course, that the microwave oven 10 may include the standard manual data input switches such as illustrated as switch positions 6, 7, 8, etc. associated with the respected modes shown in FIG. 4 along with the corresponding optical codes 48, 50, 52, etc. In that case, the oven user has a choice of either manually entering the data by actuating the respective switch positions thereby placing the selected data through manual data input 18 as shown in FIG. 2, or utilizing the optical scanner 20 and optical codes 48, 50, etc. in accordance with the present invention. Alternatively, the manual data input positions with switches 6, 7, 8, etc. can be eliminated so that the oven is controlled completely by means of the bar coded information supplied through optical scanner 20 and the bar codes 48, 50, etc.

In operating the microwave oven 10 in accordance with the present invention, the food is prepared in a normal manner and inserted into the oven. The oven user may then extend scanner 20 by pulling the retractable cable out of the mounting mechanism 24 so as to place scanner head 26 adjacent for instance the optical code 48 associated with the Bake Mode. Moving scanning head 26 across code 48 enters this data into microprocessor controller 14. In a similar manner, the oven user enters the cooking time for the Bake Mode and then moves the scanning head 26 across Start Code 58 to initiate the cooking cycle.

Mounting mechanism 24 includes a recoil spring and a pull actuated cable latch release similar to the standard automobile seat belt mechanism. Alternatively, the cable latch may be eliminated so the user may simply pull the scanner wand 20 and cable 22 away from the mounting mechanism, optically read the desired codes and allow the recoil spring to slowly retract the cable.

Figure 5:
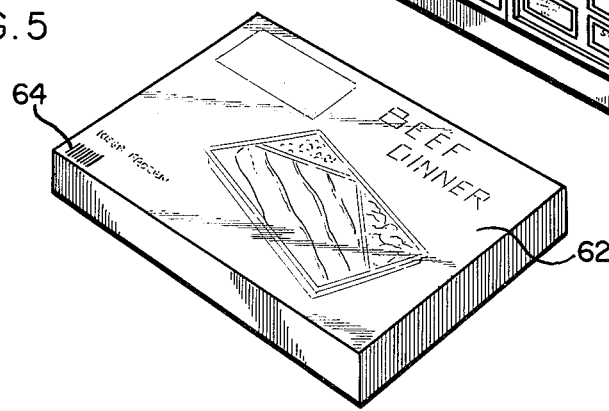
FIG. 5 illustrates the optical code being placed on a food package for reading by the optical scanner.

FIG. 5 illustrates a food package 62 with a bar code 64 containing the associated cooking instructions. In this case, the oven user simply extends the optical scanner 20 to move the reading head 26 immediately adjacent and across bar code 64 to enter the cooking instructions into microprocessor controller 14. The food item may then be removed from package 52, placed into the oven and the oven started by moving reading head 26 adjacent the bar code 58 associated with the Start Mode.

Figure 6:
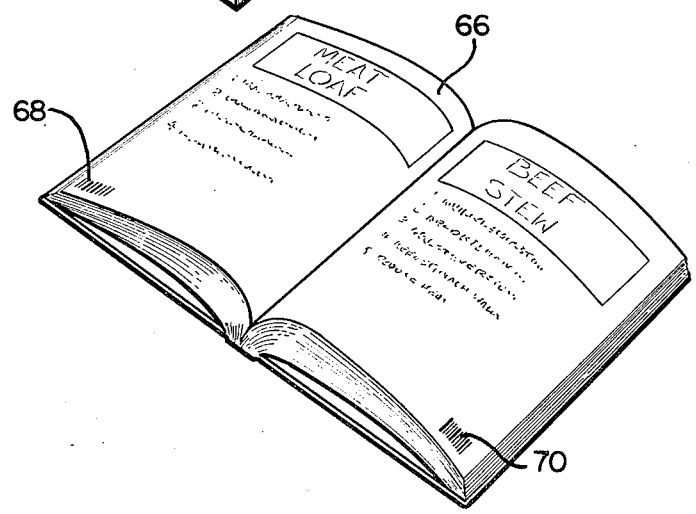
FIG. 6 illustrates a recipe book containing an optical code associated with each of the recipes for reading by the optical scanner.

FIG. 6 illustrates a recipe book 66 with optical codes 68, 70 respectively associated with a recipe. After preparation of the recipe and placing the item into oven 10, the oven user need only move scanner head 26 adjacent the respective code 68, 70 in order to enter the cooking instructions into microprocessor 14.

It is to be understood, of course, that the hand-held optical scanner 20 including fiber optic lines 28 and 34 are merely shown to illustrate an embodiment of the invention. If desired, a small light source such as a light emitting diode and a small photodetector may be mounted within the optical scanner adjacent reading head 26 and through suitable transmission and reception lenses obtain a reading of the optical code. Other types of hand-held optical scanners for reading bar codes are well-known in the art and may be suitable for use in the present invention. Examples of such hand-held optical scanners are shown for instance in the following U.S. Pat. Nos.: 4,061,380; 3,978,318; 3,866,056; 3,911,270; 3,947,817; 3,676,690; 3,784,794; 3,727,030; 3,868,514; 3,673,416; and 4,115,703.

In an alternative embodiment, one may also utilize a detector and transmitter in the hand-held optical scanner unit for detecting and transmitting the readable bar coded information to a receiver mounted within the oven. This would eliminate the need for a physical connection such as cable 22 between the scanner wand and the oven to couple fiber optic lines or electrical signal lines.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. In a microwave oven including a magnetron power source and a control means for controlling said magnetron power source in response to input data manually entered by the oven user, the improvement comprising:

optical codes respectively associated with each of said input data, each code including a series of bars and spaces having distinguishable optical characteristics;

optical reading means, including a scanner movable adjacent said respective optical codes for reading same by determining the respective optically characteristic bars and spaces and providing a control signal representing said associated input data; and means coupling and entering said control signal to said control means for controlling said magnetron power source in response to said optically read code.

2. The improvement of claim 1, wherein said optical reading means includes a light source coupled to said scanner for supplying light directed at said optical code, and a photodetector including means directing light reflected from said optical code to said photodetector.

3. The improvement of claim 2, including a first fiber optic line having one end within said scanner movable adjacent said optical code, and another end coupled to said light source for directing light from said light source to said optical code.

4. The improvement of claim 3, including a second fiber optic line having one end within said scanner movable adjacent said optical code and another end coupled to said photodetector for directing light reflected from said optical code to said photodetector.

5. The improvement of claim 1, including means for retractably mounting said scanner to said microwave oven.

6. In a microwave oven including a magnetron power source and a microprocessor controller for controlling said magnetron power source in response to input data modes entered by the oven user, the improvement comprising:

an optically readable bar code associated with a respective input data mode;

a hand-held, optical reader having a cable extendably mounted to said microwave oven, said optical reader including a front scanner head movable adjacent said optically readable bar code for directing light thereto and receiving reflected light therefrom;

a light source, including means coupling said light to be directed to said bar code;

a photodetector, including means coupling said reflected light to said photodetector for reading said bar code; and converter means converting said optically read bar code into control signals corresponding to said respective input data modes, including means coupling said control signal to said microprocessor controller.

7. The improvement of claim 6, including a fiber optic line having one end mounted within said optical reader immediately at said front scanner head, said fiber optic line extending through said cable and being coupled at the other end to said light source.

8. The improvement of claim 7, including a second fiber optic line having one end mounted within said optical reader immediately at said front scanner head, said second fiber optic line extending through said cable and being coupled at the other end to said photodetector.

9. A method of heating food in a microwave oven of the type including a magnetron power source and a control means for controlling said magnetron power source, comprising the steps of:

(a) providing at least one optical code including a series of bars and spaces having distinguishable optical characteristics, said code representing cooking instructions including time and cooking mode for heating said food; and (b) transmitting said cooking instructions represented by said optical code to said control means by scanning said code with optical reading means; and (c) thereafter heating said food by operating said magnetron power source under the control of said control means according to said cooking instructions transmitted to said control means in step (b).

10. The method of claim 9 wherein said optical code is printed in a cookbook as an integral part of a cooking recipe.

11. The method of claim 9 wherein said optical code is scanned from a package containing the food to be heated.

* * * * *